US012792700B2

(12) United States Patent
Khegai

(10) Patent No.: US 12,792,700 B2
(45) Date of Patent: Nov. 10, 2026

(54) IDENTIFICATION OF A USER REQUESTING AN ELECTRONIC DOCUMENT

(71) Applicant: Aleksandr Olegovich Khegai, Moscow (RU)

(72) Inventor: Aleksandr Olegovich Khegai, Moscow (RU)

( * ) Notice: Subject to any disclaimer, the term of this patent is extended or adjusted under 35 U.S.C. 154(b) by 509 days.

(21) Appl. No.: 18/042,311

(22) PCT Filed: May 11, 2022

(86) PCT No.: PCT/RU2022/050148
§ 371 (c)(1),
(2) Date: Feb. 21, 2023

(87) PCT Pub. No.: WO2023/018356
PCT Pub. Date: Feb. 16, 2023

(65) Prior Publication Data

US 2024/0004970 A1 Jan. 4, 2024

(30) Foreign Application Priority Data

Aug. 11, 2021 (RU) ........................... RU2021123888

(51) Int. Cl.
*G06F 21/16* (2013.01)
*G06V 30/224* (2022.01)

(52) U.S. Cl.
CPC ............ *G06F 21/16* (2013.01); *G06V 30/224* (2022.01); *G06F 2221/2101* (2013.01)

(58) Field of Classification Search
CPC ................ G06F 21/16; H04N 21/8358; H04N 2201/3233
See application file for complete search history.

(56) References Cited

U.S. PATENT DOCUMENTS 6,086,706 A * 7/2000 Brassil ............... H04N 1/32219 156/277
11,367,159 B1 * 6/2022 Holub ................... G06T 1/0021
2004/0128514 A1 * 7/2004 Rhoads ................... G07F 7/086 704/E15.045
2005/0039021 A1 * 2/2005 Alattar ............... H04N 1/32219 713/176
2009/0003646 A1 * 1/2009 Au ..................... H04N 1/32149 382/100

(Continued)

FOREIGN PATENT DOCUMENTS

CN 108449527 A * 8/2018 ........... H04N 1/3232

*Primary Examiner* — Daniel B Potratz
(74) *Attorney, Agent, or Firm* — Dhiraj Jindal; PATENT YOGI LLC

(57) ABSTRACT

The group of inventions relates to solutions that make it possible to investigate incidents connected to the dissemination of electronic documents and can be used to identify violators of confidentiality restrictions or to pinpoint the source of data leaks. The essence of the group of inventions consists in that during the marking of an original electronic document by an encoding program, the position of a portion of the elements of the document remains unchanged. The group of inventions is directed toward achieving the technical result of reducing the load on the central processor of an electronic computing device used to identify a user requesting an electronic document.

11 Claims, 4 Drawing Sheets

(56) References Cited

U.S. PATENT DOCUMENTS

| | | | | |
|---|---|---|---|---|
| 2009/0296922 | A1* | 12/2009 | Smeets | G06F 21/16 380/28 |
| 2010/0165158 | A1* | 7/2010 | Rhoads | H04N 1/00063 348/294 |
| 2015/0286843 | A1* | 10/2015 | Brant | H04L 63/0823 713/176 |
| 2020/0057843 | A1* | 2/2020 | Goyal | G06F 16/176 |
| 2021/0407141 | A1* | 12/2021 | Sharma | G06Q 20/065 |

* cited by examiner

IDENTIFICATION OF A USER REQUESTING AN ELECTRONIC DOCUMENT

FIELD OF DISCLOSURE

The present disclosure relates to solutions that enable the investigation of incidents related to the distribution and dissemination of electronic documents and can be applied to detect violators of confidentiality or to identify the source of the information leakage.

BACKGROUND

There is a known method of identifying a user who has requested an electronic document, and this method includes the following steps: receiving an electronic document request from the user, recording an electronic document request from the user, marking the original version of the requested electronic document by the encoder program, changing the type of characters in the document for each user for whom an electronic document request is received during this marking process, and sending the marked version of the requested electronic document to the user, receiving a marked version of the electronic document from another user, comparing the received fragment of the marked version of the electronic document with the original version of the electronic document, determining the items modified according to their initial location in the original version of the electronic document in the marked version of the electronic document through the decoder program, and identifying the identity of the user who received the marked version of the electronic document [U.S. Pat. No. 4,837,737, date of publication: 06.06.1989 IPC: B41J 5/44; G06F 17/21; G06F 17/24].

In order to prevent illegal copying of electronic documents, a method is known comprising the following steps: receiving an electronic document request from the user, recording the electronic document request from the user, marking the original version of the requested electronic document by means of the encoder program, in this marking process, shifting the text lines according to their location in the original version of the electronic document in accordance with the unique code assigned by the encoder program to the user to whom the electronic document request was received, and sending the marked version of the requested electronic document to the user, receiving a fragment of a marked version of the electronic document from another user, comparing the received fragment of the marked version of the electronic document with the original version of the electronic document, detecting the elements shifted by the decoder program according to their initial location in the original version of the electronic document in the marked version of the electronic document, and also determining the degree of shifting according to the above location according to the configuration, converting the comparison results into an array in a unique key-two-digited code by means of the same program, and then converting the marked version of the unique document in two steps, taking into account the identification of the user's unique version of the electronic document, [U.S. Pat. No. 6,086,706, date of publication: 11.07.2000, IPC: G03G 21/04, G07D 7/00, G07D 7/20].

As a prototype, a method for detecting a user requesting an electronic document was chosen, which included the following steps: receiving an electronic document request from the user, recording the electronic document request from the user, marking the original version of the requested electronic document by means of the encoder program, shifting the word-form elements in the text string in this marking process to the location in the original version of the electronic document by the relatively encoder program, according to a unique key in a two-digit code form assigned to the user to whom the electronic document request was received, and sending the marked version of the requested electronic document to the user, marking a version of the electronic document receiving the fragment from another user, comparing the received fragment of the marked version of the electronic document with the original version of the electronic document, in the marked version of the electronic document, detecting the elements shifted by the decoder program according to their initial position in the original version of the electronic document, and also determining the shift degrees according to the above position according to the comparison made, converting the comparison results into a unique key—a directory in the form of a two-digit code by means of the same program, and then identifying the user receiving the marked version of the electronic document, taking into account the unique key in the form of a two-digit code [U.S. Pat. No. 5,388,194, date of publication: 05.02.1997, IPC: B 41 M 3/14; G03 C 5/08; G06 F 21/24].

The common disadvantage of this prototype and known technical solutions is the high operational load of the electronic computing device, which performs the step of marking the electronic documents requested by the user in accordance with the user's unique key, and then the step of decoding the user's unique key determined from the received fragment of the marked version of the electronic document. The occurrence of this disadvantage is due to the fact that in each of the known solutions, including the prototype, in the step of marking a copy of the requested electronic document, the coordinates of all the elements contained in the document, including the characters, the words in the lines or the intervals between the words, are changed without any principles or dependencies, and as a result, the number of commands that must be executed by the central processor of the electronic computing device and then stored or converted into the unique key of the user receiving the marked copy of the electronic document increases significantly. This is also linked to the central processor of the electronic computing device recognizing the difference between the received fragment of the marked version of the electronic document and the original version, and the step of determining the coordinates of the elements that are displaced in the marked version of the electronic document for the calculation of a unique user key based on this process, which allows for the subsequent determination of the user receiving a copy of the electronic document. To do this, the central processor must compare each shifted element of the marked version of the electronic document with each other in its original version, which, due to the possible low quality of the received fragment of the marked version of the electronic document, may require multiple iterations of this step and significantly complicate or make impossible the determination of the fragment coordinates of the shifted elements in the marked version of the electronic document and then the calculation of the user's unique key according to the results of this comparison, which significantly reduces the efficiency, the method of identifying the user requesting the electronic document with the received fragment of the electronic document, and under the current conditions, the method of identifying the user requesting the electronic document, while reducing the operational load of the central processor of an electronic computing device, the user requesting the electronic document may require the development of a solution that allows to reduce the operational load of a central processor, which requires the development of a solution that maintains the identification efficiency of the electronic document relative to the received fragment of the marked version of the electronic document.

The technical problem to be solved by the present disclosure is to increase the effectiveness of the identification of the user requesting the electronic document according to the received fragment of the marked version of the electronic document.

SUMMARY

The technical result the disclosed embodiments seek to achieve is to reduce the operational load of the central processor of the electronic computing device identifying the user requesting the electronic document relative to the received fragment of the marked version of the electronic document.

An additional technical result that the disclosed embodiments seek to achieve consists in reducing the operational load of the central processor of the electronic computing device performing the step of marking the electronic documents requested by the user, the method of determining the user requesting the marked version of the electronic document according to the fragment received.

An additional technical result that the disclosed embodiments seek to achieve is that the speed of identification of the user requesting the electronic document according to the received fragment of the marked version of the electronic document is increased by the execution of the algorithm by the central processor of the electronic computing device to bring the received fragment of the marked version of the electronic document into a planar form.

The essence of the first embodiment from the disclosed embodiments is as follows.

The method of identifying a user requesting an electronic document based on the received fragment of the marked version of the electronic document includes: the step of receiving an electronic document request from the user, recording the electronic document request from the user, marking the original version of the requested electronic document by the encoder program, in the process of marking some items in the position of these items in the original version of the electronic document relative to the unique key assigned to the user for whom the electronic document request was received by the encoder program, and sending the marked version of the requested electronic document to the user, receiving a fragment of the marked version of the electronic document from another user, comparing the received fragment of the marked version of the electronic document with the original version of the electronic document, determining the displaced items on the fragment of the marked version of the electronic document according to their initial position in the original version of the electronic document by the decoder program, converting the results of the comparison by the same program into a unique key, and then taking into account the unique key obtained, determining the identity of the user receiving the marked version of the electronic document. In contrast to the prototype, during the marking of the original electronic document by the encoder program, the position of some elements of the electronic document remains unchanged, and the determination of the elements displaced according to their initial position in the original version of the electronic document by the decoder program in the marked version of the electronic document is performed taking into account the elements whose position remained unchanged during the marking of the electronic document by the encoder program.

The essence of the second embodiment from the disclosed embodiments is as follows.

The step of marking the original version of the electronic document requested by the user of the method of identifying the user requesting the electronic document according to the received fragment of the marked version of the electronic document includes: marking the original version of the electronic document by the encoder program, at the time of such marking, in accordance with the unique key assigned by the encoder program to the user to whom the electronic document request was received, these elements are shifted by the encoder program according to its initial position in the original version of the electronic document. Unlike the prototype, in the process of marking the original version of the electronic document by the encoder program, the location of some of its elements remains unchanged.

The step of receiving an electronic document request from the user enables the central processor of the electronic computing device to receive information about the requested electronic document and also to obtain the data of the user from whom the request is sent from the electronic device.

An electronic document is a computer file that describes the content of a document using standard format definition languages such as PostScript, troff, SGML, etc.

The step of recording an electronic document request from the user can be performed by the user request processing program uploaded to the central processor of the electronic information processing device, and it enables the information related to the requested electronic document and also the data of the user requesting the electronic document to be recorded in the memory of the electronic information processing device.

The encoder program is a program code that is loaded into the central processor of an electronic computing device and provides the user with the ability to assign a unique key, as well as the ability to mark the original version of the desired electronic document based on that key.

To assign a unique key to the user, the central processor using the encoder program can retrieve user data from the memory of the electronic computing device and then convert that data to a sequence or relative position of elements of the user's unique key. Such items may be text or graphic items or symbols. However, the most preferred method is the conversion of the user's data, e.g., personal data, into binary code, which reduces the working load of the central processor of the electronic computing device. The existing connection between the user's data, the unique key, and the information about the desired electronic document is then stored in the memory of the electronic computing device by the encoder program.

The encoder program then performs the step of marking the original version of the desired electronic document. For this, a unique user key is obtained from the memory of the electronic computing device, while the content of the original version of the requested electronic document is converted in accordance with the data stored in this key.

Some items in the original version of the electronic document requested in the markup process are shifted by the encoder program according to their starting position. Shifting some elements can be accomplished by changing the coordinates of the location of individual elements in an electronic document whose contents are in raster format, or by changing the line spacing and indents in an electronic document whose contents are in raster format. It is also possible to convert the content of an electronic document from raster format to text and vice versa. Shifting some of the items in any of the options offered is performed according to the user's unique key. For example, scrolling may be due to the presence of a space between text or graphic characters in a unique key, a difference in the height of the characters, or a difference between the characters of the unique key itself. However, the most preferred option is to shift some elements in accordance with the bit of the binary code, which also plays a unique user key role, which reduces the working load of the central processor of the electronic computing device. Thus, for example, when the bit value of the binary code is 0, a word can be shifted one pixel to the left in a row of an electronic text document, and when the bit value of the binary code is 1, a word can be shifted one pixel to the right in a row of an electronic text document.

In the process of marking the original version of the requested electronic document by the encoder program, the location of some of its elements remains unchanged. Selection of some of the items whose location remains unchanged may be made randomly for each electronic document by the central processor. However, in the case of marking electronic documents in one format, e.g., only text documents, in order to reduce the working load of the central processor of the electronic computing device, the selection of a fragment of the elements may be predetermined by making an appropriate adjustment in the encoder program code, whichever one will remain unchanged. In the most preferred variant, where the marking of electronic text documents is performed with a minimum processing load on the central processor of the electronic computing device, the double or single words in the text line of the electronic text document may be selected as unchanged elements.

The electronic computing device then sends the marked version of the requested electronic document to the electronic device of the user requesting it.

The step of receiving a fragment of the marked version of the electronic document from another user allows the process of identifying the user requesting the electronic document according to that fragment to be initiated. A fragment may be obtained by scanning a paper carrier with the contents of a marked version of an electronic document, or by photographing or filming the contents of an electronic document displayed on a paper carrier or a monitor display or other similar output device, or by receiving a copy of the marked version of the document in electronic form.

The step of comparing the received fragment of the marked version of the electronic document with the original version of the electronic document is also performed with the automatic detection of the original version of the electronic document by the central processor in the memory of the electronic computing device, according to the qualities or elements contained in the content of the fragment.

In the comparison step, the decoder program is enabled by the central processor. The said decoder program is a program code in which the comparison of the received fragment of the marked version of the electronic document with the original version of the electronic document is performed taking into account the elements whose location remains unchanged in the marking step. This enables you to bring the resulting fragment and the original version of the electronic document into a single coordinate system based on the elements whose position remains unchanged, and then to determine the shift coordinates of the remaining elements on the resulting fragment accordingly. This allows for significantly reducing the operational load of the central processor of the electronic computing device, which identifies the user requesting the electronic document, according to the received fragment of the marked version of the electronic document.

Further, according to the received fragment of the marked version of the electronic document for increasing the speed of identification of the user requesting the electronic document, an algorithm can be performed by the central processor of the electronic computing device to bring the received fragment of the marked version of the electronic document into a planar form in the comparison step.

Initially, a "Moiré filter" can be applied to the received fragment of the marked version of the electronic document, which reduces the negative impact of the resampling effect. The Moiré filter is a sliding window that filters objects by geometric size. The brightness of the resulting fragment of the marked version of the electronic document can then be aligned using median filtering.

After that, the affine transformation of the received fragment of the marked version of the electronic document can be performed to bring its scale and rotation in space in accordance with the scale and rotation of the original version of the electronic document.

After that, in order to eliminate perspective distortions, a resulting projective transformation of the signed version of the electronic document can be performed. After that, approximation and correction of the marked version of the electronic document fragment with a two-dimensional polynomial can be performed, which eliminates lens distortion. Then, in the last step, approximation by splines and correction of the marked version of the electronic document fragment can be performed, which allows the elimination of local irregularities.

The step of converting the comparison results into a unique key by the decoder program is performed based on data regarding which element or sequence of elements in the unique key corresponds to this or another shift type.

The most preferred variant is to convert the shift of some elements into a binary code that plays the role of a unique user key, which also reduces the operating load of the central processor of the electronic computing device. Thus, for example, if a word in a line of an electronic text document is shifted one pixel to the left, the value of the binary code bit would be 0, and if a word in a line of an electronic text document is shifted one pixel to the right, the value of the binary code bit would be 1.

The step of identifying the user receiving the marked version of the electronic document is performed by taking into account the unique key received by the decoder program from the fragment of the marked version of the electronic document. In this step, the central processor sends a request to the memory for a unique sequence of items or relative location that can be represented by a unique key and removes the detected user key bundle from the memory with its data.

The disclosed embodiments may be performed from known materials using known technologies, which indicates that the disclosed embodiments meets the "industrial applicability" patentability criterion.

The disclosed embodiments differs from the previous technology by a number of basic features previously unknown, and these basic features are characterized by the following:

when marking the original electronic document by means of the encoder program, the position of some elements of the said original electronic document remains unchanged, thereby eliminating not only the need to change the coordinates of some elements, but also the possibility of not fixing the coordinates of the "anchor elements" in the content of the original and the marked electronic document, and also ensuring that the coordinates of these elements are stored in the memory of the electronic computing device.

the determination by the decoder program of the displacing elements in the marked version of the electronic document according to their initial position in the original version of the electronic document is performed by taking into account the elements whose position remains unchanged when the electronic document is marked by the encoder program so that the content of the fragment of the marked version of the electronic document is superimposed on the content of the original version of the electronic document is performed in the coordinate system of the "anchor elements", the coordinates of the shifted elements are calculated according to the coordinates of each "anchor element", not according to the entire content of the electronic document.

The set of essential features of the disclosed embodiments allow the fixation of the coordinates of the "anchor elements" in the content of the original and marked electronic document, based on the coordinates of the "anchor elements", the content of the fragment of the marked version of the electronic document is superimposed on the content of the original version of the electronic document, and the coordinates of the displacing elements on the resulting fragment are calculated according to the "anchor elements", and thus eliminating the need to scroll through the step of marking some elements of the electronic document, the number of iterations required to superimpose the contents of the original and marked electronic documents is reduced to initiate the process of determining the coordinates of the displacement of the elements on a fragment of the marked version of the electronic document by the decoder, eliminating the need to determine the displacement coordinates of the "anchor elements", and also the need to further process the coordinates of the "anchor elements" and to convert them into a unique key, thus making it possible to identify the user without the loss of unique key efficiency obtained.

In this way, the technical result of reducing the operational load of the central processor of an electronic computing device that identifies the user requesting the electronic document according to the received fragment of the marked version of the electronic document is reached and thus the effectiveness of this method is increased.

The disclosed embodiments have a number of basic features that were not previously known in terms of technical level, and this shows that the disclosed embodiments comply with the patentability "inventive step" criterion.

From the state of the art, when the electronic document requested by the central processor is marked, methods of identifying the user requesting the electronic document in which an arbitrary shift in the content of words, symbols, and lines of text is performed and a unique user key is generated are known. Further, these methods disclose the extraction of a unique user key by the central processor from a set of coordinates of the marked and shifted elements obtained in the process of multiple comparisons of the contents of the original electronic document.

However, there is no known method for identifying a user requesting an electronic document, in which some elements remain immobile in the step of marking an electronic document and the coordinates of these elements are fixed in an "anchor points" manner. Likewise, it is not known from the prior art that the extraction of a unique user key by the central processor is possible by placing the contents of a fragment of a marked version of an electronic document on the contents of the original version of a document in a single manner relative to the coordinates of the "anchor points", while the calculation of the coordinates of the displaced elements is possible according to the coordinates of the "anchor points".

Accordingly, the disclosed embodiments meets the patentability "invention step" criterion and complies with this criterion.

The embodiments from the disclosed embodiments are interconnected and constitute a single creative concept consisting of: the method of identifying the user requesting the electronic document according to the received fragment of the marked fragment of the electronic document comprises the step of marking the original of the electronic document requested by the user, which indicates the conformity of the disclosed embodiments with the patentability "unity of invention" criterion.

DETAILED DESCRIPTION OF DRAWINGS

Figure 1:
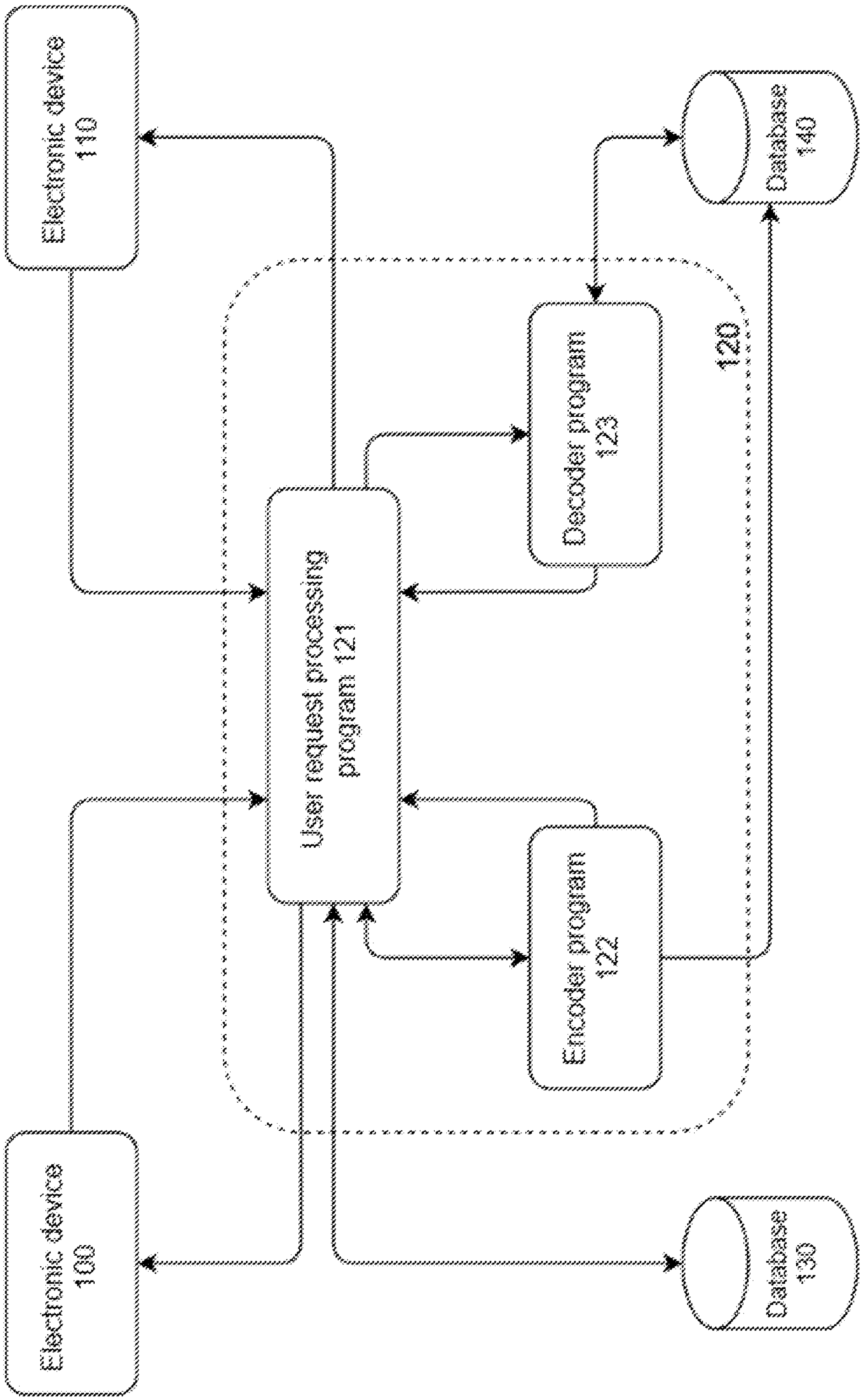
FIG. 1 is a schematic of a system for identifying a user requesting an electronic document in accordance with some embodiments.
Figure 2:
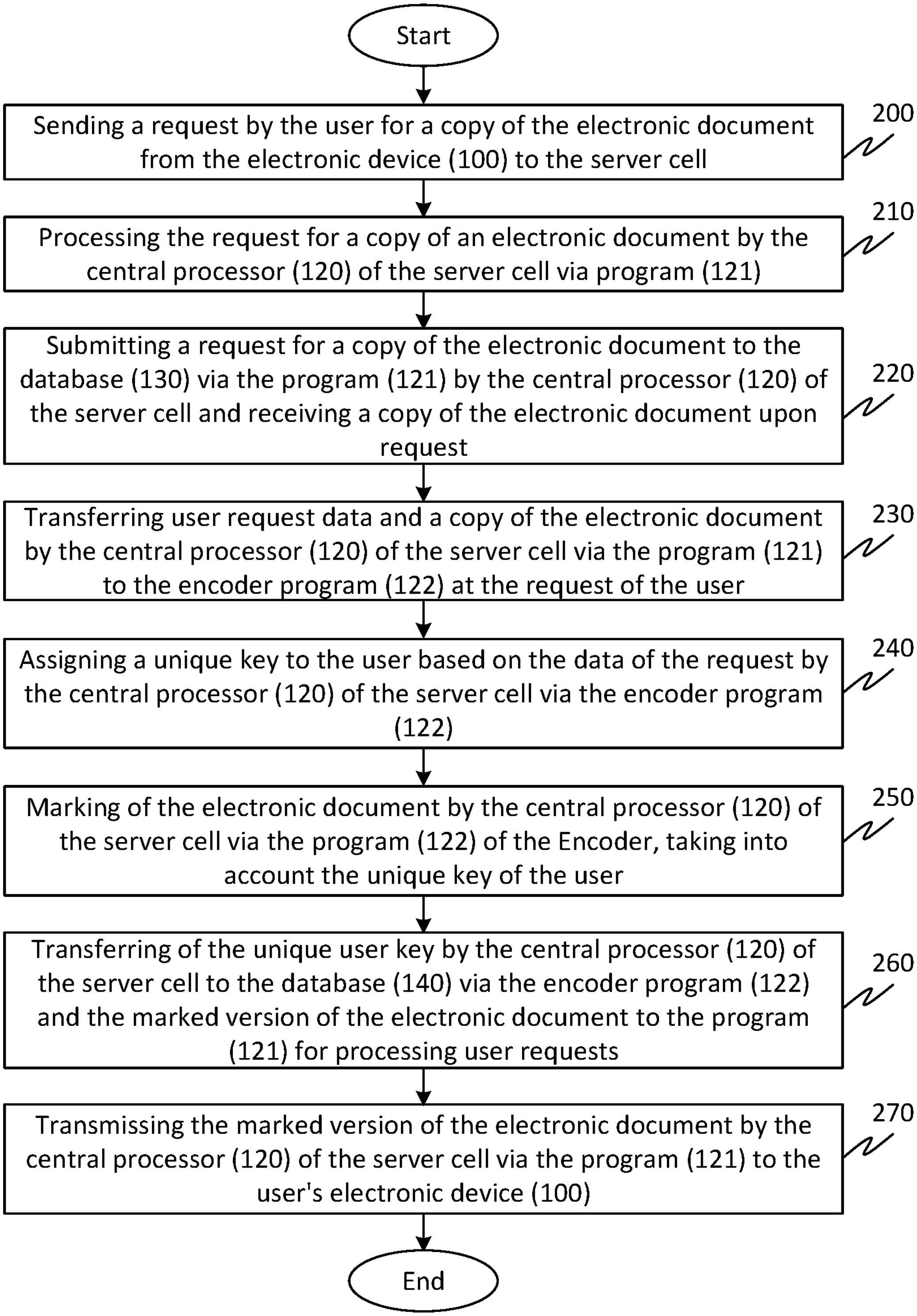
FIG. 2 is a flowchart of a method of determining the user requesting the electronic document, the step of marking the electronic documents requested by the user in accordance with some embodiments.
Figure 3:
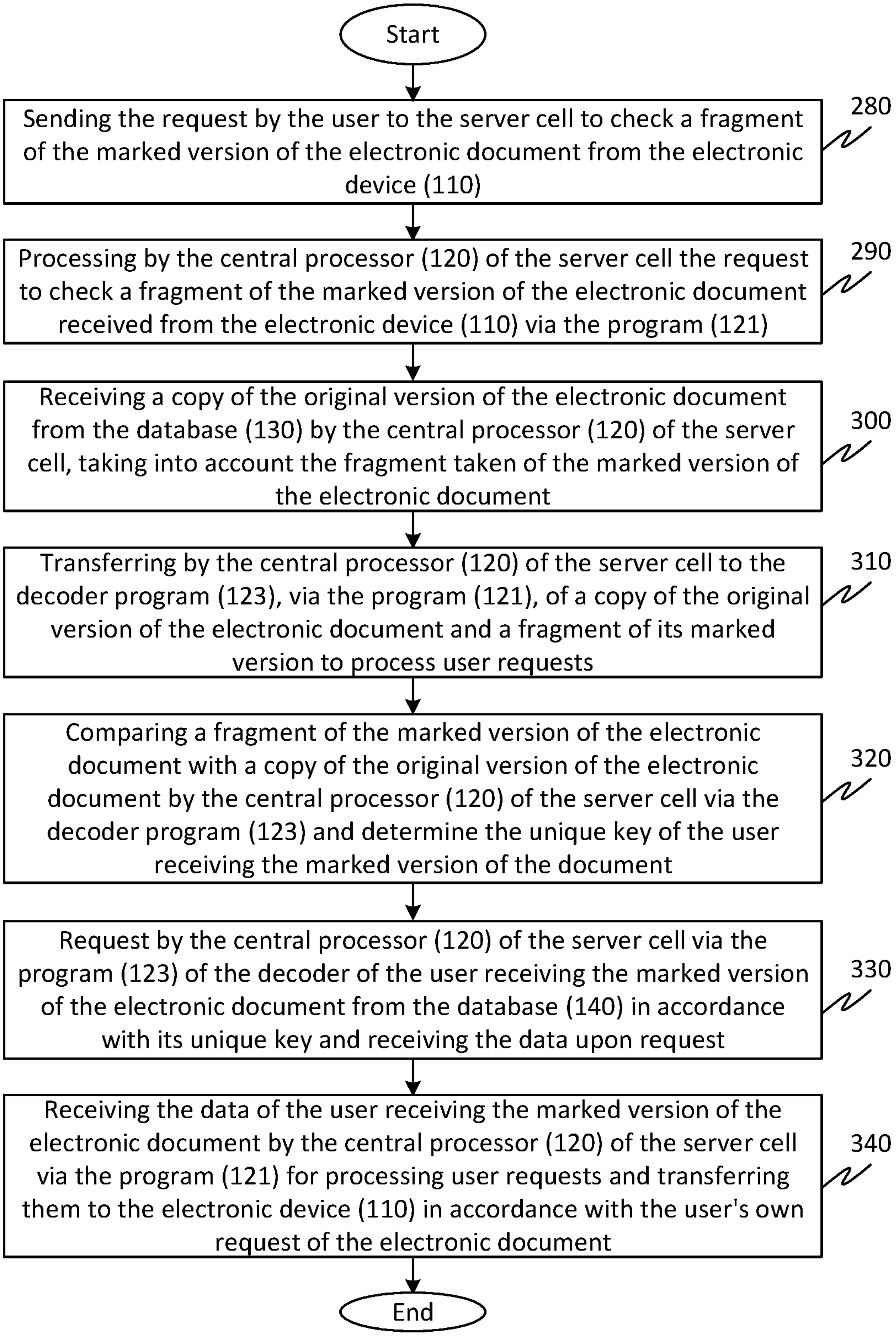
FIG. 3 is a flowchart of a method of determining the identity of the user requesting the electronic document according to the received fragment of the marked version of the electronic document in accordance with some embodiments.
Figure 4:
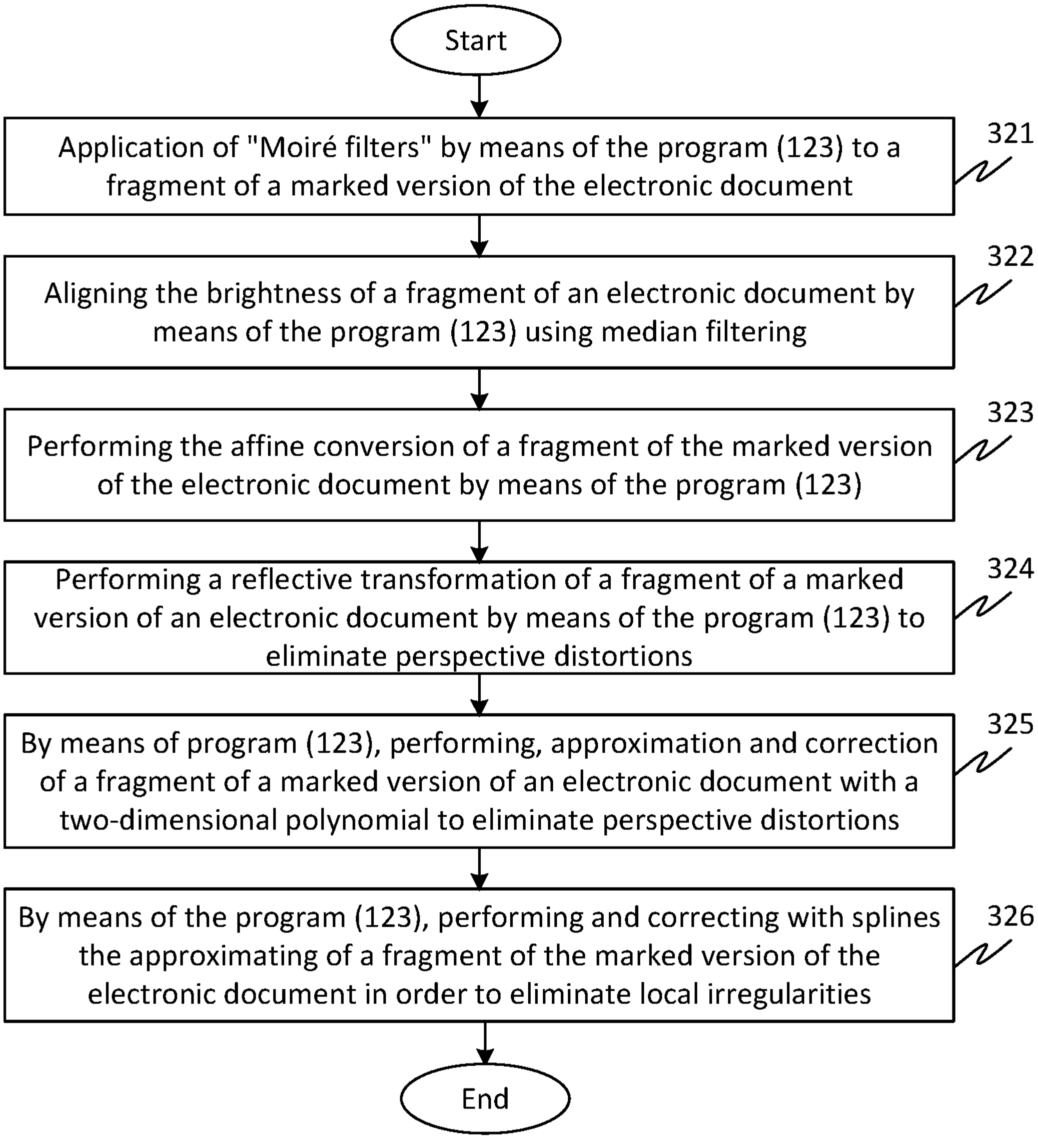
FIG. 4 is a flowchart of a method for bringing the received fragment of the marked version of the electronic document into a planar form in accordance with some embodiments.

In order to illustrate the possibility of realizing and applying the disclosed embodiments and to provide a more complete understanding of the essence of the disclosed embodiments, a variant of embodiment, which can be modified or supplemented in any way, is given below and, however, the said disclosed embodiments is not limited in any way to the variant presented.

The system for identifying the user requesting the electronic document consists of a first user electronic device (100), a second user electronic device (110), a server cell comprising an interconnected central processing unit (120), system memory, and a system data bus comprising system components, including central processor associated memory, and loaded with the user request processing program (121), the encoder program (122), the decoder program (123), the electronic document database (130), and the user-specific key database (140). In this case, the databases (130) and (140) may be represented by tables, lists, and other machine-readable data sets stored in the physical storage medium.

The method of identifying a user requesting an electronic document is performed by a number of main steps, which comprise:

Step 200: the step where the user sends a request for a copy of the electronic document from the electronic device (100) to the server cell;

Step 210: in this step, the server cell central processor (120) processes the request for a copy of the electronic document through the user request processing program (121). This step is done using network protocols, interactively over a computer network, based on the "Client-Server" network architecture. In this step, the central processor (120) records and detects the data of the copy of the electronic document requested by the user and also the personal data of the user by using the HTTP data transfer protocol, exchanging data with the electronic user device (100), Step 220, wherein the server cell central processor (120) sends a request to the electronic document database (130) for a copy of the electronic document and receives a copy of the electronic document via the user request processing program (121) upon request. For this, database management systems are used, which are presented as a series of software and linguistic tools, Step 230, wherein the server cell central processor (120) transmits user request data and, upon request, a copy of the electronic document to the encoder program (122) via the user request processing program (121);

Step 240, wherein the server cell central processor (120) assigns a unique key to the user based on the user's request data via the encoder program (122). To do this, the program (122) uses the user's personal data from the electronic device (110) that received the request in Step 200. The personal data of this user is converted into binary code by the program (122) and stored in the memory of the server cell;

Step 250, wherein the central processing unit (120) of the server cell marks a copy of the original version of the electronic document, taking into account the unique key of the user through the program (122) of the encoder. To mark up a copy of an electronic text document, its content can initially be converted from text format to PostScript, troff, SGML, etc. The program (122) then performs a word shift in the text line of this document by the encoder. To do this, the program (122) detects the words in each line of text, then fixes the initial position of the double words in the line of text, and then micro-corrects the remaining words by shifting them by some, for example, one or two pixels. In this case, the encoder program (122) receives data from the unique user key generated in Step 240 on which direction shifting the words in the text line should be done. Thus, if the bit of the binary code of the unique user key is 0, then the word is shifted to the left, and if the bit of this binary code is 1, then the word is shifted to the right.

Step 260, wherein the central processor (120) of the server cell transfers the unique user key via the encoder program (122) to the database (140) and the marked version of the copy of the electronic document to the program (121) for processing the user requests;

Step 270, wherein the central processor (120) of the server cell transfers the signed version of the copy of the electronic document to the user's electronic device (100) via the program (121);

Step 280, wherein a verification request is sent from the electronic device (110) to the user server cell for the fragment of the signed version of the electronic document. A scanner may be used to obtain this fragment when the text is presented on paper or a camera may be used when the text is presented in electronic format, for example on a personal computer monitor screen;

Step 290, wherein the central processing unit (120) of the server cell processes the request to check, via the user request processing program (121), a fragment of the signed version of the electronic document received from the electronic device (110);

Step 300, wherein the central processor (120) of the server cell receives a copy of the original version of the electronic document from the database (130), through the program (121), for processing user requests, taking into account the received fragment of the marked version of the electronic document. To do this, the program (121) automatically recognizes the data (tags) of the received fragment of the marked version of the electronic document and searches the database (130) for tags that match the data of the original versions of the electronic documents;

Step 310, wherein the central processor (120) of the server cell transfers a copy of the original version of the electronic document and a fragment of the marked version thereof to the decoder program (123) via the user request processing program (121);

Step 320, wherein the central processor (120) of the server cell compares the fragment of the marked version of the electronic document with the original version of the electronic document via the decoder program (123) and determines the unique key of the user receiving the marked version of the electronic document.

To do this, the decoder program (123) uses optical character recognition technology to determine the words in the received fragment of the marked version of the electronic document. Then, depending on the quality of the received fragment of the marked version of the electronic document, the program (123) may perform the operation of bringing the received fragment of the marked version of the electronic document into a planar form.

During this operation, the program (123) applies "Moiré filters" to the fragment of the marked version of the electronic document in sub-step 321, allowing the removal of resampling effects from the fragment obtained, for example, by a photograph of the monitor screen. The Moiré filter is a sliding window that filters objects by geometric size. Thereafter, program (123), at sub-step 322, aligns the brightness of the fragment of the signed version of the electronic document using median filtering. Then, in sub-step 323, an affine transformation of the document fragment is performed to account for the scale of the fragment of the document and its rotation in space to account for the scale and rotation of the original version of the electronic document in space. Thereafter, the program (123) performs a projective transformation of a fragment of the signed version of the electronic document in sub-step 324 to eliminate perspective distortions. Next, in sub-step 325, approximation and correction of the marked version of the electronic document fragment with a two-dimensional polynomial is performed to eliminate lens distortion, and then approximating with splines in sub-step 326 and correcting a fragment of the marked version of the electronic document to eliminate local irregularities is performed.

After the document fragment has been reduced to a planar form, the received fragment of the marked version of the electronic document is superimposed on a copy of the original version of the electronic document, and in the process, the words in each text line of the received fragment of the marked version of the electronic document and in a copy of the original version are compared.

Then, through the program (123), the shift of the remaining words in each line of text is recorded, the coordinate difference between the words on the fragment of the signed version of the electronic document is calculated, and a binary code consisting of a series of bits is generated. In this case, the value of each bit of this binary code corresponds to the word shifting to the left or right in the text string. Thus, if a word in a text string is shifted to the left, the program (123) assigns the bit a value of 0. If a word in the text string is shifted to the right, then the bit is assigned a value of 1. Thereafter, the resulting binary code is stored in an internal memory by the central processor (120).

Step 330, wherein the central processor (120) of the server cell requests the data of the user receiving the marked version of the electronic document from the database (140) in accordance with its unique key via the decoder program (123) and receives the data from the database (130) upon request; Step 340, wherein the central processor (120) of the server cell receives the data of the user receiving the marked version of the electronic document via the program (121) to process the user requests and transmits them to the electronic device (110) upon the request of its user.

In order to demonstrate the possibility of realizing and implementing the invention group and to provide a more complete understanding of its essence, an implementation variant is presented below, which can be modified or completed in any way, and the present disclosed embodiments is not limited in any way to the variant presented.

The disclosed embodiments work as follows:

The process of marking an electronic copy of an electronic text document, which is requested by the user Sergey Ivanov and which is as follows: "This text is an example that describes a certain state of execution of a disclosed embodiments and aims at a better understanding of the essence of a disclosed embodiments . . . ", is performed as follows:

through the program (122), the encoder assigns the user a unique key by converting the user's personal data, in particular, the Sergey name and Ivanov surname entered by it, into a binary code having the following image and shape: «00001110001011010001101000001110001011100001111000000111000101111000110010000111000101110000111000000111000101110000111100000111000101110001000100001010000001110001011000010000100001110001011100001101100001110001011100001100100001110001011100010110100001110001011100010111000001110001011100001101 1» the encoder marks the requested copy of the electronic text document with the user's unique key via the program (122). To do this, the position of the even words in each line of text remains unchanged, and the odd words in each line of text are shifted one pixel to the left (●) or right (*) according to the value of 0 or 1 of each bit.

An example of a text image labeled with the words "anchors" as well as traditional symbols for shifting words one pixel to the left (●) and one to the right (*) is shown below. "● This text ● is an example that describes ● a particular case of realizing* the disclosed embodiments and aims to best understand the ● essence of the disclosed embodiments . . . ".

Thereafter, the user's unique key is stored in the database (140) and a signed copy of the electronic text document is sent to the user on the electronic device (100).

The process of identifying the user requesting an electronic text document is performed as follows:

by means of the program (123), the decoder takes a photograph of a fragment of a text document received by the electronic device (110) from the monitor display and this is brought into a planar form.

through the program (123), the decoder determines the original version of the electronic document and superimposes a reduced fragment of a text document on a planar form on the original version of the text document.

through the program (123), the decoder compares the original version of the electronic document and matches and compares the reduced fragment of the text document to the planar form with the original version of the electronic text document.

by means of the program (123), the decoder determines the coordinates of the left and right shift of single words in a fragment of a text document according to the position of the double words in the original version of the electronic document and converts them into words corresponding to the bit value of the binary code.

The binary code obtained in the text processing process had the following format: "101101000110100000".

Through the program (123), the decoder searches for this binary code among the unique user keys in the database (140) by matching and comparing it with the existing binary codes, depending on the user's first and last name.

Binary code is detected and located in the unique key of the user Sergey Ivanov, which has the following form: «00001110001011010001101000001110001011100001111000001110001011110001100100001110001011100001110000001110001011100001111000001110001011100010001000010100000011100010110000100001000011100010111000011011000011100010111000011001000011100010111000101101000011100010111000101110000011100010111000011011»Thus, the decoder identifies the user requesting the electronic text document by means of the program (123) with a fragment of the marked copy of the said electronic text document and then the data about that user is sent to the electronic device (110).

At the same time, thanks to the fact that the position of the double words in the marked version of the copy of the electronic text document does not change, the hardware load of the server cell performing both the step of marking a copy of the electronic text document with a unique user key and the step of decoding a marked copy to determine the unique key of the electronic text document is reduced in order to determine the unique key of the user requesting the electronic document.

In this way, the technical result of reducing the operational load of the central processor of the electronic computing device that identifies the user requesting the electronic document by the fragment of the marked version of the electronic document is reached and the efficiency and effectiveness of this method are increased.

The invention claimed is:

1. A method of determining a user requesting an electronic document, the method further comprising:

steps of receiving an electronic document request from the user, saving the electronic document request received from the user, marking an original version of the electronic document by an encoder program, wherein during the marking, positions of a first subset of elements of the original version of the electronic document are fixed and remain unchanged, and positions of remaining elements of the original version of the electronic document, not included in the first subset of elements, are shifted by the encoder program according to a unique key assigned by the encoder program to the user, wherein the unique key comprises a binary code, wherein a position of a remaining element in a line of the original version of the electronic document, is shifted by one pixel in a left direction according to a coordinate system of the original version of the electronic document if a bit in the binary code corresponding to the remaining element is 0, or shifted by one pixel in a right direction opposite to the left direction according to the coordinate system of the original version of the electronic document if the bit in the binary code corresponding to the remaining element is 1, sending a marked version of the electronic document to the user, receiving a fragment of the marked version of the electronic document from another user, comparing the fragment of the marked version of the electronic document with the original version of the electronic document, determining, by a decoder program, displaced elements on the fragment of the marked version of the electronic document according to an initial position of the displaced elements in the original version of the electronic document, converting comparison results into the unique key by the decoder program and identifying the user receiving the marked version of the electronic document, wherein the determining is performed based on the positions of the first subset of elements of the original version of the electronic document that remain unchanged.

2. The method according to claim 1 further comprising assigning the unique key to the user based on a user's request data via the encoder program, wherein the assigning of the unique key to the user is performed by converting user's personal data into the binary code.

3. The method according to claim 1, wherein during the marking of the original version of the electronic document, positions of even words in the line of the original version of the electronic document are selected to remain unchanged, and positions of odd words in the line of the original version of the electronic document are shifted.

4. The method according to claim 1, wherein the comparing further comprises performing an algorithm to bring the fragment of the marked version of the electronic document into a planar form.

5. The method according to claim 4 further comprising applying a "Moiré filter" to the fragment of the marked version of the electronic document to allow a removal of resampling effects from the fragment of the marked version, wherein the "Moiré filter" is a sliding window that filters objects by geometric size.

6. The method according to claim 5 further comprising aligning a brightness of the fragment of the marked version of the electronic document by means of a median filtering.

7. The method according to claim 6 further comprising performing an affine conversion of the fragment of the marked version of the electronic document, wherein a scale and rotation of the fragment of the marked version of the electronic document are adapted to a scale and rotation in space of the original version of the electronic document based on the performing of the affine conversion of the fragment of the marked version of the electronic document.

8. The method according to claim 7 further comprising performing a projective transformation of the fragment of the marked version of the electronic document.

9. The method according to claim 8 further comprising performing an approximation and correction of the fragment of the marked version of the electronic document with a two-dimensional polynomial, wherein the performing of the approximation and correction eliminates lens distortion.

10. The method according to claim 9 further comprising performing approximation by splines and correction of the fragment of the marked version of the electronic document to eliminate local irregularities.

11. The method according to claim 1, wherein the identifying of the user requesting the electronic document includes marking the original version of the electronic document by the encoder program according to the fragment of the marked version of the electronic document.

* * * * *